(12) United States Patent  (10) Patent No.: US 7,646,565 B2
Biskeborn et al.  (45) Date of Patent: Jan. 12, 2010

(54) TAPE HEAD WITH OUTRIGGER

(75) Inventors: Robert Glenn Biskeborn, Hollister, CA (US); Jason Liang, San Jose, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 11/463,219

(22) Filed: Aug. 8, 2006

(65) Prior Publication Data

US 2008/0049358 A1  Feb. 28, 2008

(51) Int. Cl.
*G11B 5/187* (2006.01)
*G11B 5/48* (2006.01)

(52) U.S. Cl. ........................ 360/129; 360/121
(58) Field of Classification Search ............ 360/130.31, 360/130, 32, 130.21, 129, 240, 121, 122, 360/128
See application file for complete search history.

(56) References Cited

U.S. PATENT DOCUMENTS

| 5,282,103 | A | | 1/1994 | Hatch et al. ................. 360/104 |
| 5,905,613 | A | | 5/1999 | Biskeborn et al. ......... 360/130.21 |
| 6,118,625 | A | * | 9/2000 | Heinz et al. ................. 360/121 |
| 6,747,849 | B1 | | 6/2004 | Le et al. .................... 360/245.7 |
| 6,771,456 | B2 | * | 8/2004 | Winarski et al. .......... 360/78.02 |
| 6,937,435 | B2 | * | 8/2005 | Saliba ......................... 360/122 |
| 7,382,581 | B2 | * | 6/2008 | Biskeborn .................... 360/129 |
| 7,414,811 | B2 | * | 8/2008 | Biskeborn .................... 360/129 |
| 7,474,488 | B2 | * | 1/2009 | Czarnecki et al. ............. 360/63 |
| 7,486,479 | B2 | * | 2/2009 | Nakao et al. ........... 360/130.21 |
| 2003/0039077 | A1 | * | 2/2003 | Biskeborn .................... 360/291 |
| 2003/0123179 | A1 | * | 7/2003 | Molstad et al. ................ 360/75 |
| 2004/0061972 | A1 | * | 4/2004 | Biskeborn ..................... 360/90 |
| 2006/0007579 | A1 | * | 1/2006 | Kirschenbaum et al. ...... 360/75 |
| 2006/0034021 | A1 | * | 2/2006 | Wu ............................. 360/316 |
| 2006/0056108 | A1 | | 3/2006 | Saliba ......................... 360/129 |
| 2006/0232883 | A1 | * | 10/2006 | Biskeborn et al. ........... 360/129 |
| 2007/0030594 | A1 | * | 2/2007 | Biskeborn et al. ........... 360/129 |
| 2007/0047123 | A1 | * | 3/2007 | Czarnecki et al. .............. 360/55 |
| 2007/0047131 | A1 | * | 3/2007 | Berman et al. ........... 360/77.01 |
| 2007/0047141 | A1 | * | 3/2007 | Biskeborn et al. ........... 360/129 |
| 2007/0047142 | A1 | * | 3/2007 | Biskeborn .................... 360/129 |
| 2007/0047146 | A1 | * | 3/2007 | Biskeborn et al. ........... 360/240 |

OTHER PUBLICATIONS

Chinese Office Action Summary from Application No. 2007101402295 Mailed on Jun. 5, 2009.

* cited by examiner

*Primary Examiner*—Jefferson Evans
(74) *Attorney, Agent, or Firm*—Zilka-Kotab, PC (57) ABSTRACT

A magnetic head assembly according to one embodiment of the present invention includes a substrate having a tape bearing surface. A plurality of elements are coupled to the substrate and positioned towards the tape bearing surface. The elements selected from a group consisting of readers, writers, and combinations thereof. A base is coupled to the substrate. The base has an outrigger formed integrally therewith. The outrigger causes a tape passing thereacross to approach the substrate at a first wrap angle relative to a plane of the tape bearing surface of the substrate.

33 Claims, 6 Drawing Sheets

TAPE HEAD WITH OUTRIGGER

FIELD OF THE INVENTION

The present invention relates to tape head structures, and more particularly, this invention relates to a tape head structure having an outrigger for establishing a tape wrap angle.

BACKGROUND OF THE INVENTION

Figure 1:
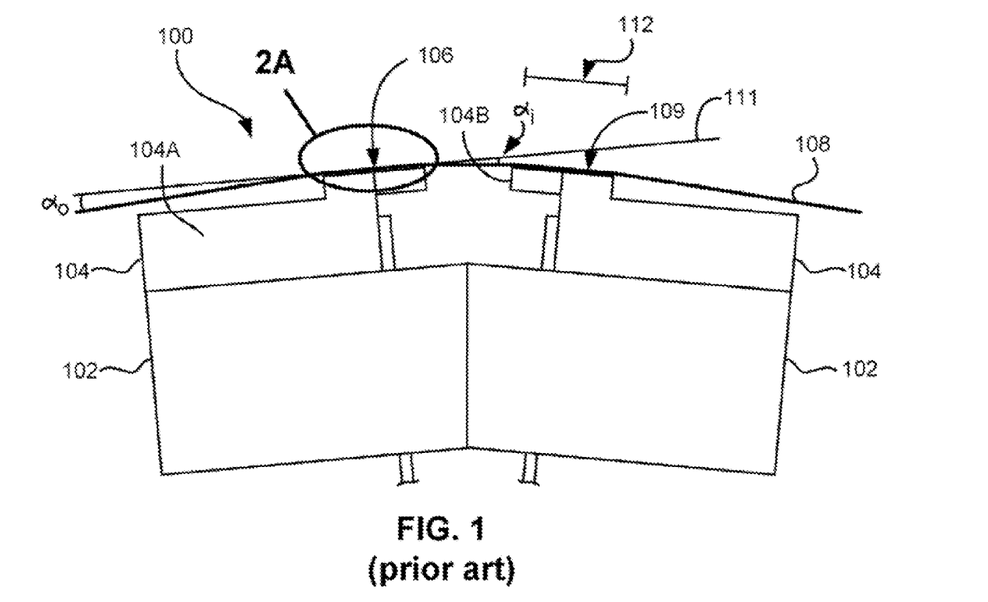
FIG. 1 illustrates a traditional flat-lapped magnetic tape head, in accordance with the prior art.

FIG. 1 illustrates a traditional flat-lapped bi-directional, two-module magnetic tape head 100, in accordance with the prior art. As shown, the head includes a pair of bases 102, each equipped with a module 104. The bases are typically ceramic beams shaped in the form of a U that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Two common parameters are associated with heads of such design. One parameter includes the tape wrap angles $\alpha_i$, $\alpha_o$ defined between the tape 108 and a plane 111 in which the upper surface of the tape bearing surface 109 resides. It should be noted that the tape wrap angles $\alpha_i$, $\alpha_o$ includes an inner wrap angle $\alpha_i$ which is often similar in degree to an external, or outer, wrap angle $\alpha_o$. The tape bearing surfaces 109 of the modules 104 are set at a predetermined angle from each other such that the desired inner wrap angle $\alpha_i$ is achieved at the facing edges. Moreover, a tape bearing surface length 112 is defined as the distance (in the direction of tape travel) between edges of the tape bearing surface 109. The wrap angles $\alpha_i$, $\alpha_o$ and tape bearing surface 112 are often adjusted to deal with various operational aspects of heads such as that of FIG. 1.

Figure 2A:
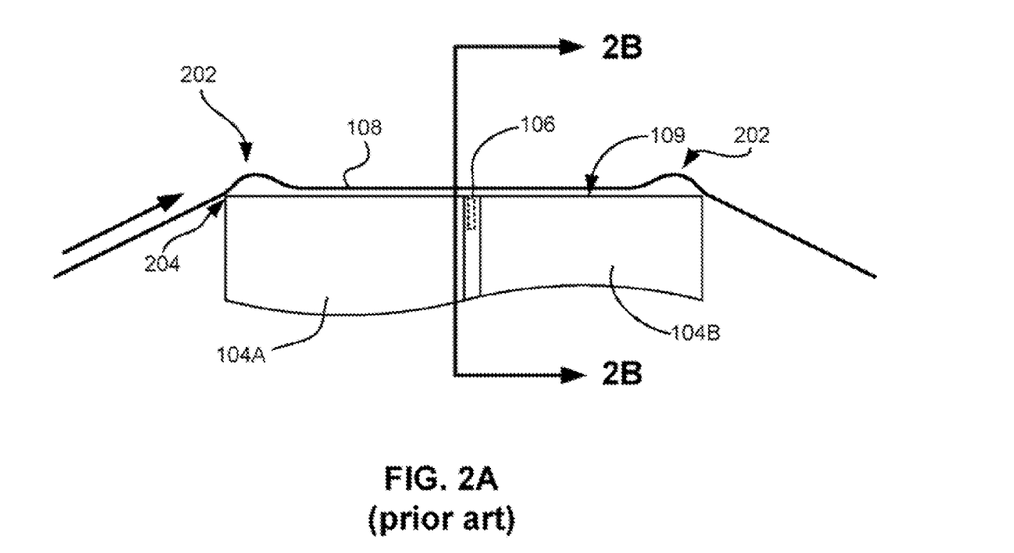
FIG. 2A is an enlarged view of a Circle 2A of FIG. 1, showing a first and second known effect associated with the use of the head of FIG. 1

FIG. 2A is an enlarged view of the area encircled in FIG. 1. During use of the head of FIG. 1, various effects traditionally occur. With reference to FIG. 2A, a first known effect associated with the use of the head 100 is that when the tape 108 moves across the head as shown, air is skived from below the tape 108 by a skiving edge 204 of the substrate 104A. Instead of the tape 108 lifting from the tape bearing surface 109 of the module (as intuitively it should), the reduced air pressure in the area between the tape 108 and the tape bearing surface 109 allows atmospheric pressure to urge the tape towards the tape bearing surface 109.

To obtain this desirable effect, the wrap angle $\alpha_o$ is carefully selected. An illustrative wrap angle is about 0.9°±0.2. Note, however, that any wrap angle greater than 0° results in tents 202 being formed in the tape 108 on opposite edges of the tape bearing surface 109. This effect is a function of tape stiffness and tension. For given geometrical wrap angles for example, stiffer tapes will have larger tents 202.

If the wrap angle $\alpha_i$, $\alpha_o$ is too high, the tape 108 will tend to lift from the tape bearing surface 109 in spite of the vacuum. The larger the wrap angle, the larger the tent 202, and consequently the more air is allowed to enter between the tape bearing surface 109 and tape 108. Ultimately, the forces (atmospheric pressure) urging the tape 108 towards the tape bearing surface 109 are overcome and the tape 108 becomes detached from the tape bearing surface 109.

Figure 2B:
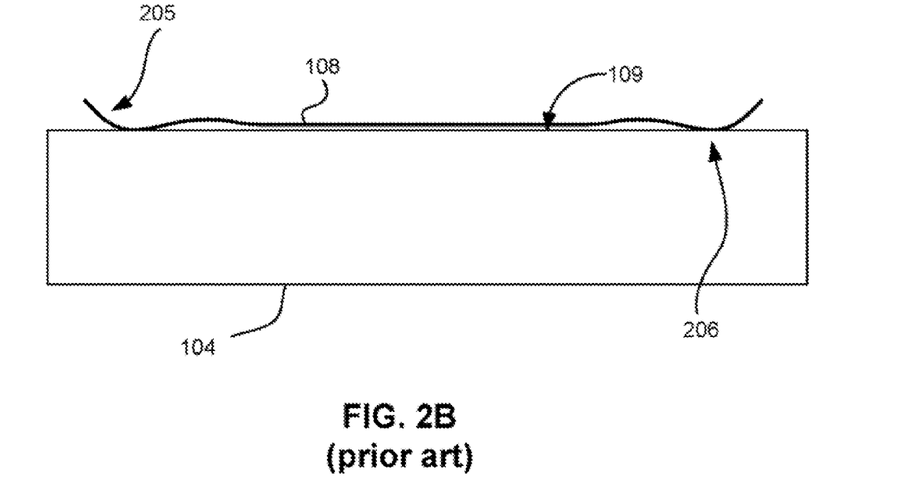
FIG. 2B is a cross-sectional view taken along Line 2B of FIG. 2A, showing a third known effect associated with the use of the head of FIG. 1.

As shown in FIG. 2B, if the wrap angle $\alpha_i$, $\alpha_o$ is too small, the tape tends to exhibit tape lifting 205, or curling, along the side edge of the tape bearing surface 109. This is a result of air leaking in at the edges and tape mechanical effects. Particularly, the edges of the tape tend to curl away from the tape bearing surface 109, resulting in edge loss or increased spacing between the edges of the tape and the tape bearing surface 109. This is undesirable, as data cannot reliably be written to the edges of a tape in a system subject to edge loss.

Additionally, the tape lifting 205 results in additional stress at points 206 which, in turn, may cause additional wear of the head. Further augmenting such tape lifting 205 is the fact that the tape 108 naturally has upturned edges due to widespread use of technology applied in the video tape arts.

The external wrap angles $\alpha_o$ are typically set in the drive, such as by rollers. The offset axis creates an orbital arc of rotation, allowing precise alignment of the wrap angle $\alpha_o$. However, situations arise where rollers may not be the most desirable choice to set the external wrap angles $\alpha_o$. For example, rollers require extra headroom in a drive, particularly where they are adjustable. Additionally, rollers, and particularly adjustable roller systems, may be more expensive to install in the drive. A further drawback of this approach is mechanical alignment cannot be completed independent of signal read readiness.

Figure 3:
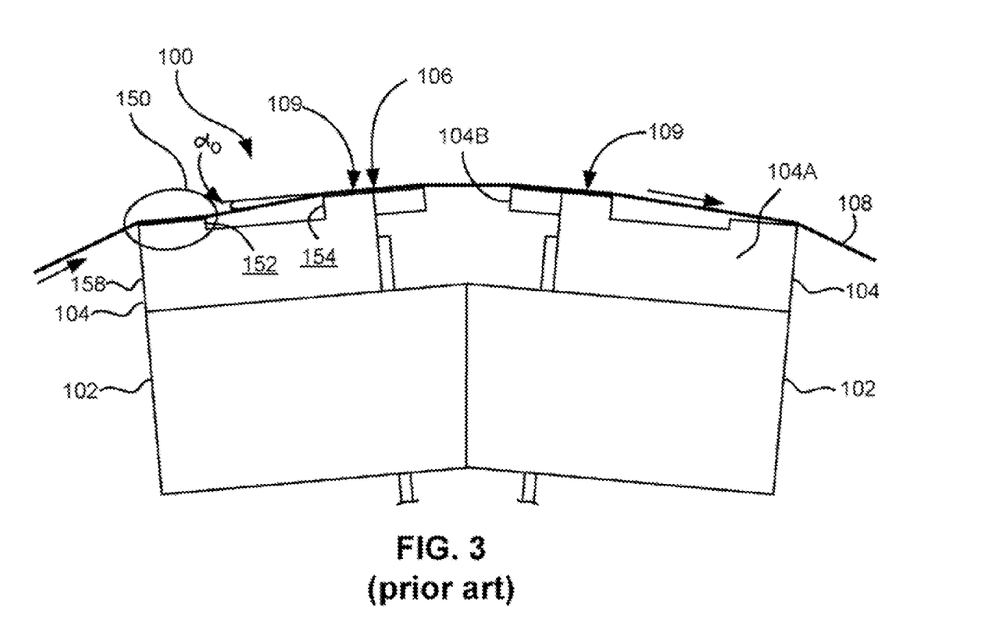
FIG. 3 is a side view of a magnetic tape head with integral outriggers.

FIG. 3 illustrates one proposed solution to set the desired external wrap angles $\alpha_o$, and which may be less expensive than implementing adjustable rollers. The proposed solution comprises forming outriggers 150 on the module 104, as shown in FIG. 3. The outriggers 150 set the external wrap angles $\alpha_o$. However, as the fabrication of tape head components moves towards use of thinner wafers, the distance between the front and back faces of the module 104 is reduced. When outriggers 150 are used, a minimum free space span between the outrigger inner edge 152 and the outer edge 154 of the primary tape bearing surface 109 is required to compensate for the aforementioned tape effect, namely tenting. Particularly, in a flat-profile tape head (as shown), the elements 106 are positioned between the substrate 104A and a closure 104B. The primary tape bearing surface 109 needs to be long enough in the direction of tape travel so that tenting does not occur over the elements 106, because reliability of the read/write functions depends in part on the tape-head spacing.

Because of the requisite length of the primary tape bearing surface 109, in combination with the fact that the bending moment of the tape propagates out from the outrigger, the distance between the outer edge 154 of the primary tape bearing surface and the back end 158 of the substrate 104A becomes too small to accommodate an outrigger. Accordingly, it will not be possible to create and outrigger on the same substrate on which the transducers are formed in the next generation of heads.

Another difficulty created by the reduced span is that the height of the outrigger must be kept to a very tight tolerance to maintain the proper wrap angle, as the shorter distance between outrigger and primary tape bearing surface means there is less room for deviation.

There is accordingly a clearly-felt need in the art for a tape head assembly in which the critical wrap angles are fixed on the head assembly itself. There is also a clearly-felt need for a way to provide an outrigger on a tape head assembly of small proportions.

SUMMARY OF THE INVENTION

A magnetic head assembly according to one embodiment of the present invention includes a substrate having a tape bearing surface, and a plurality of elements coupled to the substrate and positioned towards the tape bearing surface, the elements being selected from a group consisting of readers, writers, and combinations thereof. A base is coupled to the substrate, the base having an integrally formed outrigger, the outrigger being for causing a tape passing thereacross to approach the substrate at a first wrap angle relative to a plane of the tape bearing surface of the substrate.

In one embodiment of the present invention, tape bearing surfaces of the substrate and outrigger lie along substantially parallel planes, the planes being offset from one another. For example, the plane of the outrigger tape bearing surface may be positioned in a range of about 0.002 to about 0.014 mm below the plane of the substrate tape bearing surface.

In another embodiment of the present invention, the outrigger tape bearing surface is about parallel to a tape oriented at a desired wrap angle relative to the substrate tape bearing surface. In yet another embodiment of the present invention, the outrigger tape bearing surface is angled from the substrate tape bearing surface by greater than a desired wrap angle of a tape relative to the substrate tape bearing surface.

A thickness of the substrate in a particularly preferred embodiment is less than about 1 mm, and may be less than about 0.75 mm.

An illustrative range of the first wrap angle is about 0.7° to about 1.1°.

In one embodiment of the present invention, the outrigger has a tape bearing surface, wherein a second wrap angle is defined between the plane of the outrigger tape bearing surface and a tape traveling towards the outrigger tape bearing surface. For example, the second wrap angle may be greater than about 0.1° and less than about 2°.

The outrigger tape bearing surface may have different shapes in different embodiments. In some embodiments, the outrigger tape bearing surface is planar. In other embodiments, the outrigger tape bearing surface has a rounded portion and a planar portion. In further embodiments, the outrigger tape bearing surface is rounded.

A head assembly in particularly preferred embodiments further comprises a second substrate having a second substrate tape bearing surface, a plurality of elements coupled to the second substrate and positioned towards the second substrate tape bearing surface, and a second base coupled to the second substrate, the second base having an outrigger formed integrally therewith. The planes of the tape bearing surfaces of the substrate and second substrate may be angled relative to one another for setting internal wrap angles of the tape with respect to the tape bearing surfaces of the substrate and second substrate. The first wrap angle may about equal to the internal wrap angles, or different.

A tape drive system includes a head assembly as recited above, a drive mechanism for passing a magnetic recording tape over the head assembly, and a controller in communication with the head.

Methods for forming such head assemblies are also presented.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

BEST MODE FOR CARRYING OUT THE INVENTION

The following description is the best mode presently contemplated for carrying our the present invention. This description is made for the purpose of illustrating the general principles of the present invention and is not meant to limit the inventive concepts claimed herein. Further, particular features described herein can be used in combination with other described features in each and any of the various possible combinations and permutations.

In the drawings, like and equivalent elements are numbered the same throughout the various figures.

The embodiments described below disclose a new tape head design the tolerates a wider range of initial tape wrap angles in a drive implementing minute heads without sacrificing drive performance. This is accomplished by equipping the head with a novel type of outrigger, as explained below. The outriggers control the critical wrap angles within the head, and at he same time prevent the 'external' variations due to head positioning or external guide positioning errors from affecting the critical wrap angles, thus allowing a wider variation in drive-level wrap. This invention enables purely mechanical or datum-based positioning of a head in a drive.

Figure 4:
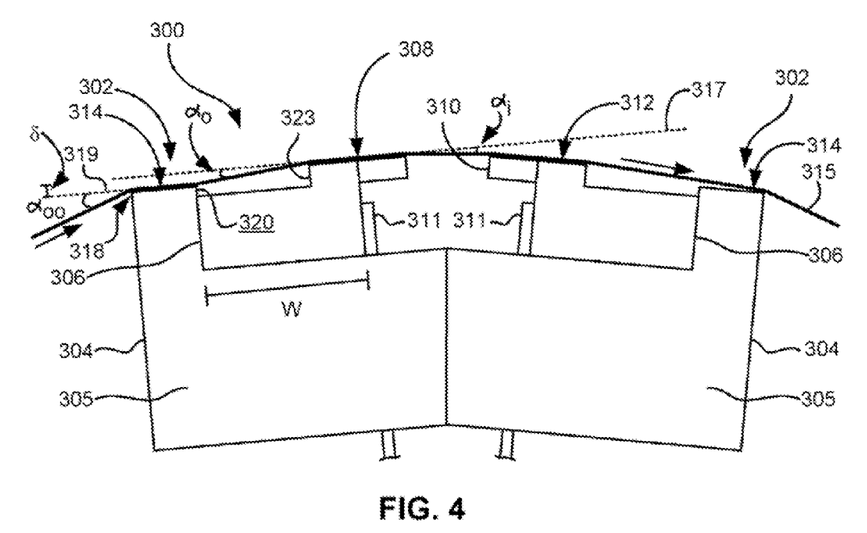
FIG. 4 is a side view of a magnetic tape head with outriggers formed integrally with the bases according to one embodiment of the present invention.

FIG. 4 illustrates an embodiment of a flat profile tape head assembly 300 having outriggers 302 formed integrally with the modules 304. As shown, the head includes opposing modules 304, each module 304 having a base 305, a substrate 306 coupled to the base 305, elements (readers and/or writers) 308, and an optional closure 310. The modules 304 are coupled together such that the tape bearing surfaces 312 of the substrates 306 are offset in such a sway that internal wrap angles $\alpha_i$ are defined between the modules 304. For purposes of present discussion, any description of the tape bearing surfaces 312 of the substrates 306 may include the tape bearing surface extending across the closure 310 (if present). Cables 311 or other suitable wiring connect the elements 308 to a controller, and read and write electronics.

Outriggers 302 are formed on each module 304. The outriggers 302 control the outer wrap angle $\alpha_o$ of the tape 315 relative to the tape bearing surfaces 312 of the substrates 306. Note that while the term "tape bearing surface" appears to imply that the surface facing the tape 315 is in physical contact with the tape bearing surface, this is not necessarily the case. Rather, it is more typical that a portion of the tape is in contact with the tape bearing surface, constantly or intermittently, and other portions of the tape ride above the tape bearing surface on a layer of air, sometimes referred to as an "air bearing".

As shown, each outrigger 302 has a flat tape bearing surface 314 that induces a small spacing between a tape 315 passing thereover and its tape bearing surface 314. When the tape 315 moves across the head, air is skived from below the tape 315 by a skiving edge 318, and instead of the tape 315 lifting from the tape bearing surface 314 of the module (as intuitively it should), the reduced air pressure in the area between the tape 315 and the tape bearing surface 314 allows atmospheric pressure to urge the tape towards the tape bearing surface 314. The outrigger 302 is positioned below the plane 317 of the tape bearing surface 312 of the substrate 306, thereby creating the proper wrap range $\alpha_o$ of the tape 315 relative to the tape bearing surface 312 of the substrate 306.

In the embodiments shown in FIG. 4, the tape bearing surfaces 312, 314 lie on parallel planes 316, 319, but are offset in a direction perpendicular to the planes 317, 319. Where the tape bearing surfaces 312, 314 lie along parallel yet offset planes, intuitively, the tape should peel off of the tape bearing surface 314 of the outrigger 302. However, the vacuum created by the skiving edge 318 of the outrigger 302 is believed to be sufficient to keep the tape adhered to the tape bearing surface 314 of the outrigger 302. The trailing end 320 of the outrigger 302 (the end from which the tape leaves the outrigger 302) is the reference point which defines the wrap angle $\alpha_o$ over the tape bearing surface 312 of the substrate 306. Thus, the outer wrap angle $\alpha_o$ is approximately $\tan^{-1}(\delta/W)$ where $\delta$ is the height difference between the planes 317 and 319, and W is the width of the slot formed between the outrigger trailing end 320 and substrate leading end 323 as shown in FIG. 4.

An interesting characteristic of the embodiment shown in FIG. 4 is that the tape does not tack down on the trailing outrigger. This in turn reduces wear on the trailing outrigger. A further benefit of this embodiment is that, because the outrigger 302 is formed directly on the base 305, the outer wrap angle $\alpha_o$ can be cut by machining surface 314 (just as the inner wrap angles $\alpha_i$ are fixed when the modules 304 are coupled together).

Figure 5:
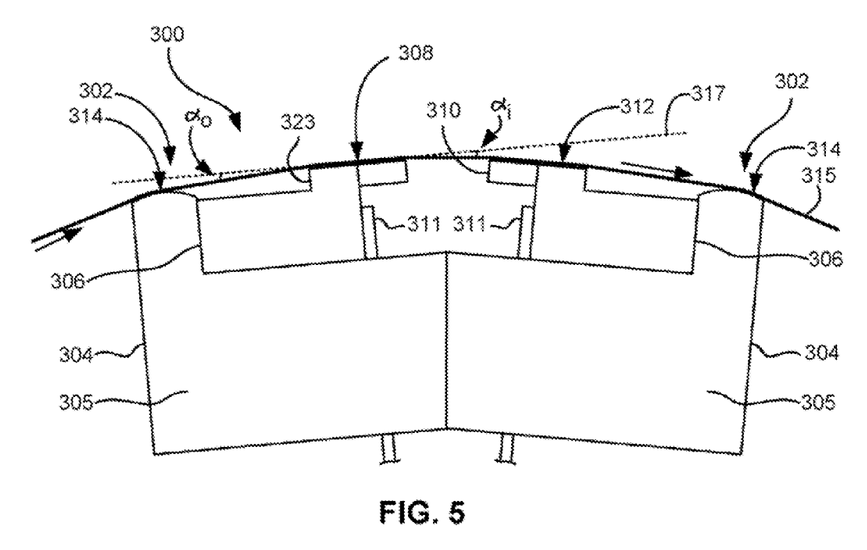
FIG. 5 is a side view of a magnetic tape head with outriggers having a rounded tape bearing surface according to one embodiment of the present invention.
Figure 6:
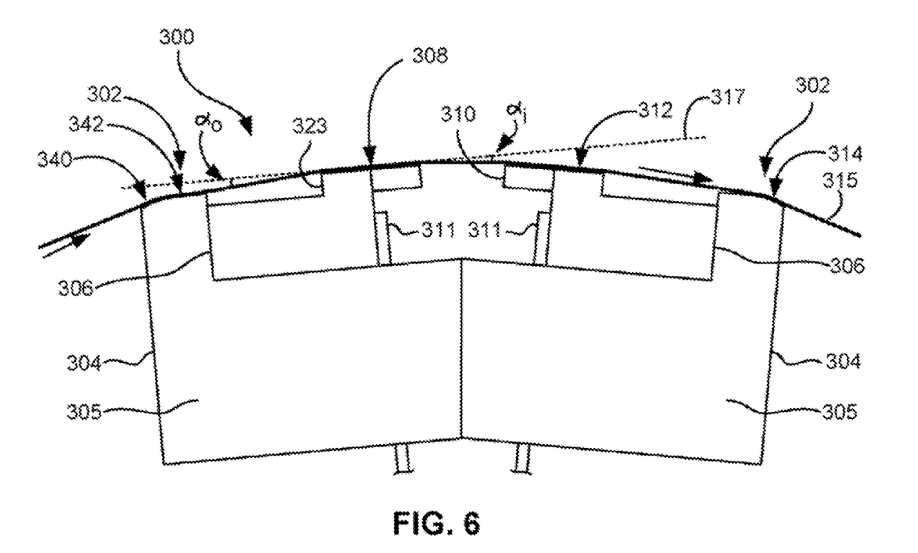
FIG. 6 is a side view of a magnetic tape head with outriggers having a partially rounded tape bearing surface according to one embodiment of the present invention.

While the outrigger 302 is preferably formed with a flat tape bearing surface 314, alternatively, the outrigger 302 can have a rounded tape bearing surface 314, as shown in FIG. 5. The rounded tape bearing surface in this and other embodiments may have a generally semicircular profile generally arcuate profile, etc. FIG. 6 shows a further variation where the tape bearing surface 314 of the outrigger 302 has a rounded leading portion 340 and a flat trailing portion 342. Other embodiments include a nonplanar, e.g., polygonal, tape bearing surface that may or may not include a rounded portion.

In any of the embodiments shown, because the outriggers 302 have no elements, the initial wrap angle $\alpha_{oo}$ of the outrigger is less critical, and so greater tolerances are permitted. Particularly, tape wrap variations at the outer (skiving) edge 318 of the outrigger 302 do not change the internal wrap angle $\alpha_i$. A suggested initial wrap angle $\alpha_{oo}$ for the outrigger 302 is 0.6°±0.5° or 0.7°±0.5°, but can be as high as 2° or higher. The inventors have found that only a very slight wrap angle $\alpha_{oo}$ (e.g., 0.1°) need be present in order to create the desired tacking of the moving tape to the tape bearing surface 314. Wraps below 0.1 degrees have a higher risk of the tape popping off the outrigger 302, and wraps above 1.1 degrees may produce an undesirable stress level in the tape. In addition, the length of the tape bearing surface 314 in the direction of tape motion should preferably be longer than the tent length 202 (FIG. 2A) to ensure proper tack down of the tape.

With continued reference to FIG. 4, the initial wrap angle $\alpha_{oo}$ can be achieved by providing a datum in the head assembly 300 itself and then positioning the head to datums in the drive. Alternatively, a locating fixture, including, for example, of a beam that straddles the guides on either side of the head 300 that has features for contacting the outrigger surfaces, may be used. Another technique is determining the wrap angles on the outriggers 302 via a laser beam. Another method includes adjustable rollers in conjunctions with a laser or a fixture to set the wrap angle $\alpha_{oo}$ (still not using tape signals). Additionally, for compatibility the head 300 can be used in drives already having signal-based wrap.

The tape bearing surface of the outrigger need not necessarily be parallel to and below the plane of the tape bearing surface adjacent to the elements, but can be offset angularly as well as spatially. In the embodiment shown in FIG. 7, the outrigger 302 has a tape bearing surface 314 that is parallel to the tape at the desired wrap angle $\alpha_o$ relative to the tape bearing surface 312 adjacent to the elements 308.

Figure 8:
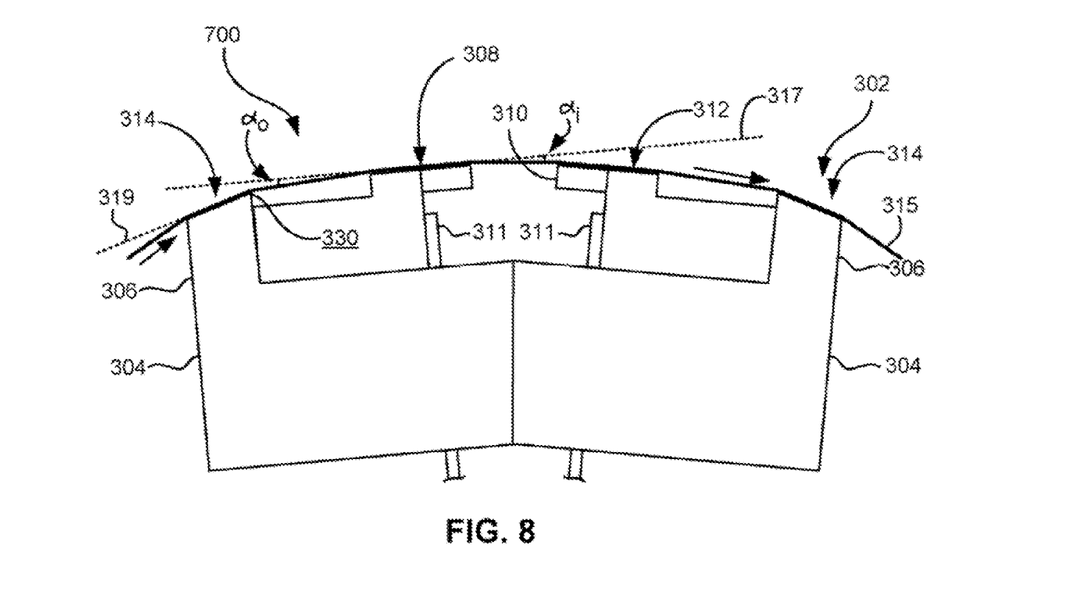
FIG. 8 is a side view of a magnetic tape head having an outrigger with a tape bearing surface that is angled relative to the tape bearing surface, such that an overwrap is created.

FIG. 8 illustrates a further embodiment, where the outrigger 302 has a tape bearing surface 314 that is angled relative to the tape bearing surface 312 adjacent to the elements 308 by greater than the desired wrap angle $\alpha_o$ of a tape relative to the tape bearing surface 12 of the substrate 306. This orientation of he tape bearing surfaces 312, 314 is generally referred to as an "overwrap" configuration, because the tape "wraps over" the trailing edge 330 of the outrigger 302.

Figure 7:
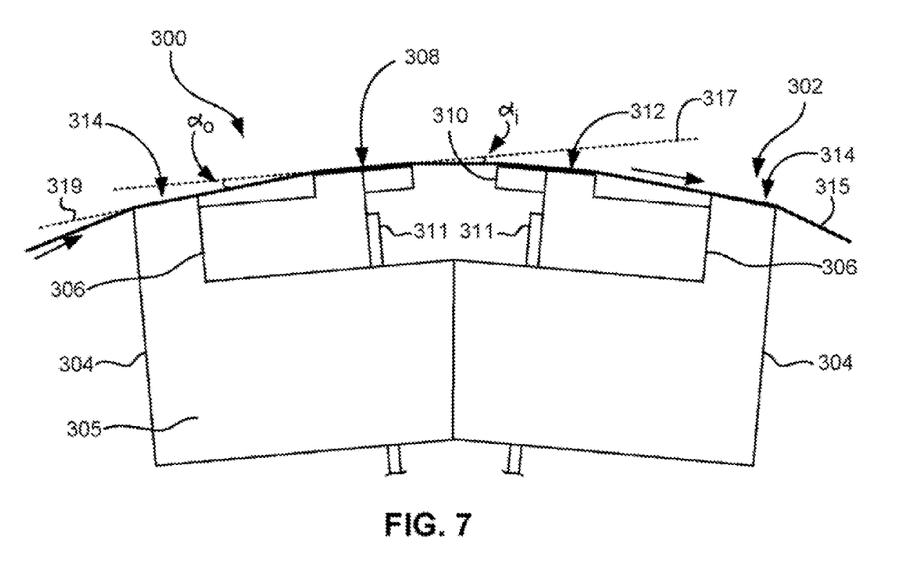
FIG. 7 is a side view of a magnetic tape head having an outrigger with a tape bearing surface that is generally aligned with a tape set at a preferred wrap angle relative to the tape bearing surface.

One advantage provided by the embodiments of FIGS. 7 and 8 is that the internal wrap angle $\alpha_o$ of a tape relative to the tape bearing surface of the substrate on a particular module is defined by the outrigger. An additional advantage of the embodiments of FIGS. 7 and 8 is that the initial wrap angle of the tape approaching the leading outrigger is less critical, as adherence of the tape to the outrigger tape bearing surface is not required.

The following description will present several methods for creating a head assembly with a outrigger as an integral portion of the base, as in the embodiments shown in FIGS. 4-8. Unless otherwise specified, the head assembly is generally formed as in a typical fabrication process. Also, those skilled in the art will appreciate that other methods of creating the head assembly may be used.

In a generic method for forming the head assembly, the base is formed with a finished or unfinished outrigger. The substrate is coupled to a base, e.g., by adhesive bonding, sonic bonding, fastener, etc. The bases in some embodiments are eventually coupled together to form a head assembly. In other embodiments, the bases are coupled to a common substrate but not each other.

According to one preferred method for forming a base with integral outrigger, a wafer is formed by traditional processing. The wafer is then machined and diced to form the various edges, valleys and protrusions, including the outrigger. The outrigger tape bearing surface may or may not be finished at this point. A preferred method of forming the bases includes cutting a wafer into rows. The rows are then machined to form the outriggers and the surface to which the substrate will be coupled. The rows are then diced into individual bases using traditional methods.

Another method for forming the base with integral outrigger includes injection molding, e.g., at AlTiC.

Yet another method of fabricating a base with integral outrigger includes machining a metal block.

The outrigger tape bearing surface maybe finished prior to joining the substrate to the base. In other embodiments, the substrate and base may first be joined, the structure optionally lapped, then the outrigger surface finished.

The tape bearing surface of the outrigger portion of the base may be finished with a precision grinder to define its height, angle and curvature. One type of grinder includes an optical or mechanical sensor that detects a first surface (such as the surface of the base to which the substrate will be coupled, or the tape bearing surface of the substrate if the substrate is already joined to the base), and, using the first surface as a reference, grinds another surface to a desired offset from the reference, preferably to within 1-2 microns of the target depth. Such grinders are available from Toshiba and Cranfield Engineering.

The bases in any of the embodiments presented herein can be constructed of any suitable material. Suitable materials include but are not limited to AlTiC, aluminum oxide, ceramics, NiZu, ferrites, zirconia, calcium titanate, barium titanate, stainless steel and other metals, etc. Such materials may be electrically insulative, electrically dissipative, etc. Preferred materials are porous materials such as AlTiC and ceramic, to maximize the strength of the adhesive bond between the module and substrate, and between the modules.

Figure 9:
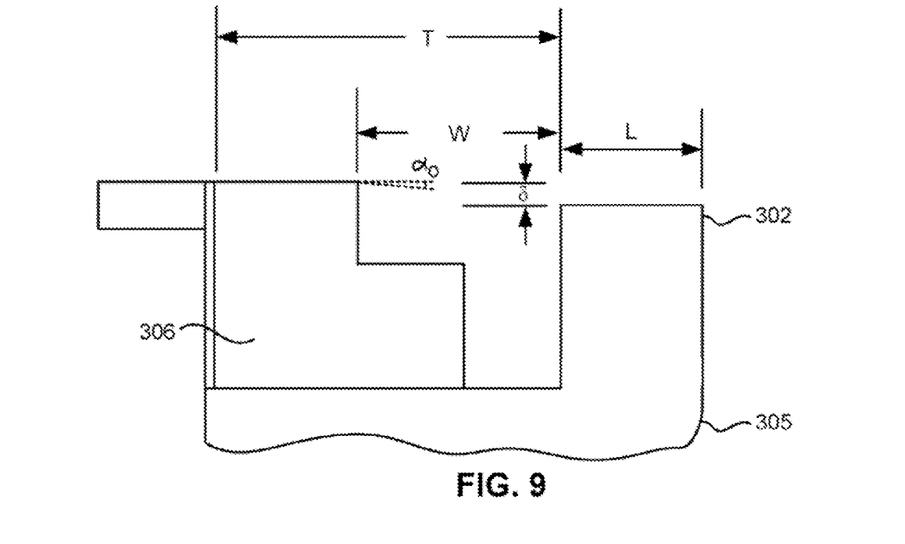
FIG. 9 is a side view of a module with an outrigger formed integrally with the base.

Referring to FIG. 9, an illustrative thickness T of the substrate 306 perpendicular to its face is less than about 1 mm. Another illustrative thickness of the substrate is less than about 0.75 mm. An illustrative width W of the slot is between about 0.2 mm and about 0.75 mm, though 0.4 mm and above is generally preferred. The tape bearing surface of the outrigger is positioned below the plane of the tape bearing surface of the substrate. The distance δ between the planes of the tape bearing surfaces will depend on the slot width and desired wrap angle. For a preferred wrap angle $\alpha_o$ of about 0.9°±0.2° and known width W, the distance δ between the planes of the tape bearing surfaces can be calculated using $\tan^{-1}(\delta/W)$. A general range for δ is between about 0.002 to about 0.014 mm. The depth of the slot is preferably sufficient to allow escape of air from the skiving edge of the substrate. In general, the slot will be deeper than the tape bearing surface of the outrigger. An illustrative depth of the slot as measured from the tape bearing surface of the substrate is about 0.009 mm to about 0.25 mm. Taken another way, an illustrative depth of the slot as measured from the tape bearing surface of the outrigger 302 is about 0.001 mm to about 0.24 mm. An illustrative width L of the outrigger is about 0.28 mm, but in general should be greater than about the width of the tent (202 in FIG. 2A) of the tape being used or expected to be used, to allow sufficient tack down length. Likewise, the width of the tape bearing surface of the substrate should be greater than about the width of the tent (202 in FIG. 2A) of the tape.

The equation $\tan^{-1}(\delta/W)$ illustrates that the wider W is, the greater the allowable range of δ to achieve the proper wrap angle. In an illustrative application, δ is controlled to within about ±1-2 microns.

FIG. 9 also illustrates that the outrigger may be spaced from the primary substrate.

One skilled in the art will appreciate that the dimensions given above and other places herein are presented by way of example only and can be made larger or smaller per the design and fabrication constraints, performance considerations, etc.

Any of the above embodiments or combinations of portions thereof can also be applied to any type of tape head and magnetic tape recording systems, both known and yet to be invented. For example, the teachings herein are easily adaptable to interleaved heads, which typically include opposing modules each having an array of alternating readers and writers configured to provide read-while-write capability.

Figure 10:
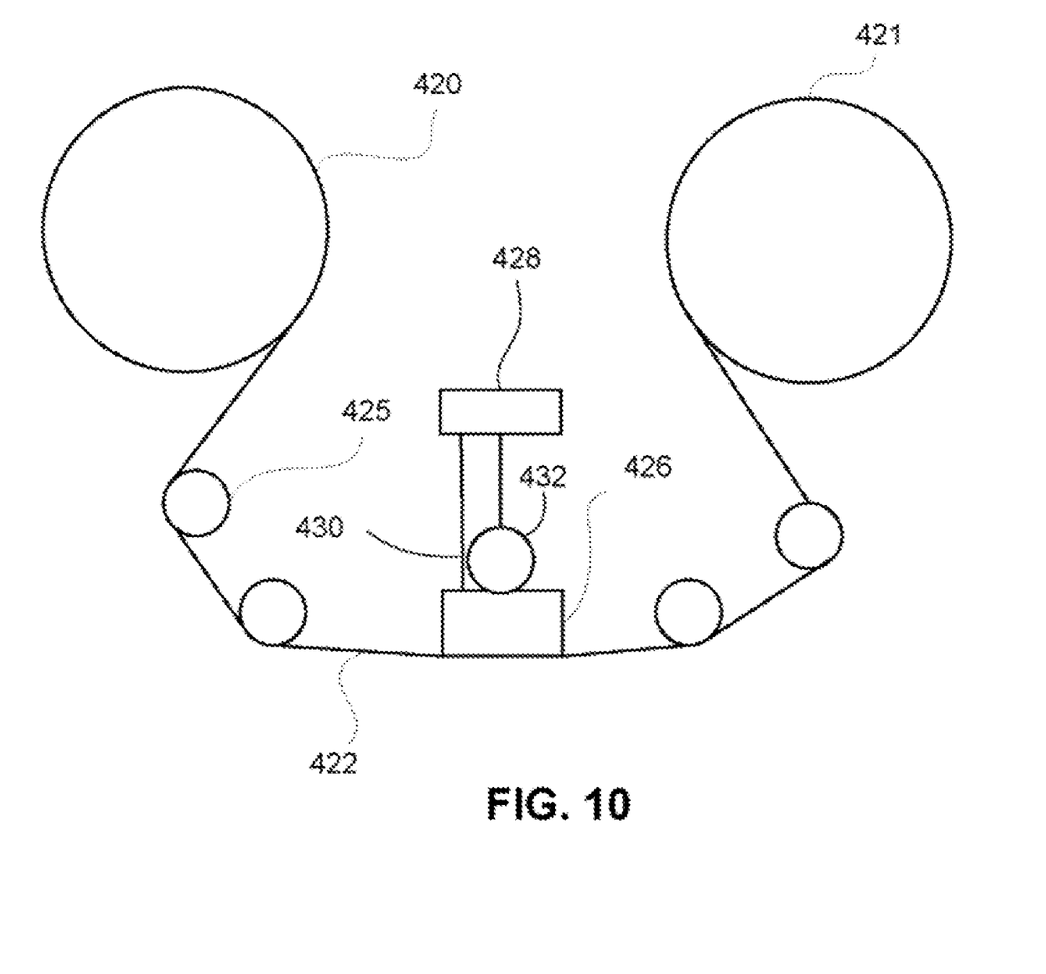
FIG. 10 is a schematic diagram of a tape drive system.

FIG. 10 illustrates a simplified tape drive which may be employed in the context of the present invention. While one specific implementation of a tape drive is shown in FIG. 10, it should be noted that the embodiments of the previous figures may be implemented in the context of any type of tape drive system.

As shown, a tape supply cartridge 420 and a take-up reel 421 are provided to support a tape 422. These may form part of a removable cassette and are not necessarily part of the system. Guides 425 guide the tape 422 across a preferably bidirectional tape head 426, of the type disclosed herein. Such tape head 426 is in turn coupled to a controller assembly 428 via an MR connector cable 430. The controller 428, in turn, controls head functions such as servo following, write bursts, read functions, etc. An actuator 432 controls position of the head 426 relative to the tape 422.

A tape drive, such as that illustrated in FIG. 10, includes drive motor(s) to drive the tape supply cartridge 420 and the take-up reel 421 to move the tape 422 linearly over the head 426. The tape drive also includes a read/write channel to transmit data to the hear 426 to be recorded on the tape 422 and to receive data read by the head 426 from the tape 422. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head assembly, comprising:
a substrate having a tape bearing surface;
a plurality of elements coupled to the substrate and positioned towards the tape bearing surface, the elements being selected from a group consisting of readers, writers, and combinations thereof; and
a base coupled to the substrate, the base having an integrally formed outrigger, the outrigger being for causing a tape passing thereacross to approach the substrate at a first wrap angle relative to a plane of the tape bearing surface of the substrate, wherein the base and the substrate are separate parts that are coupled together,
wherein the outrigger has a tape bearing surface. a second wrap angle being defined between the plane of the outrigger tape bearing surface and a tape traveling towards the outrigger tape bearing surface, the second wrap angle being greater than about 0.1°.

2. The head assembly as recited in claim 1, wherein the outrigger has a tape bearing surface, the tape bearing surfaces of the substrate and outrigger lying along substantially parallel planes, the planes being offset from one another.

3. A magnetic head assembly comprising:
a substrate having a tape bearing surface;
a plurality of elements coupled to the substrate and positioned towards the tare bearing surface, the elements being selected from a group consisting of readers, writers, and combinations thereof; and a base coupled to the substrate, the base having an integrally formed outrigger, the outrigger being for causing a tape passing thereacross to approach the substrate at a first wrap angle relative to a plane of the tape bearing surface of the substrate, wherein the base and the substrate are separate parts that are coupled together, wherein the outrigger has a tape bearing surface, the tape bearing surfaces of the substrate and outrigger lying along substantially parallel planes, the planes being offset from one another, wherein the plane of the outrigger tape bearing surface is positioned in a range of about 0.002 to about 0.014 mm below the plane of the substrate tape bearing surface.

4. The head assembly as recited in claim 1, wherein the outrigger has a tape bearing surface, the outrigger tape bearing surface being about parallel to a tape oriented at a desired wrap angle relative to the substrate tape bearing surface.

5. The head assembly as recited in claim 1, wherein the outrigger has a tape bearing surface, the outrigger tape bearing surface being angled from the substrate tape bearing surface by greater than a desired wrap angle of a tape relative to the substrate tape bearing surface.

6. The head assembly as recited in claim 1, wherein a thickness of the substrate is less than about 1 mm.

7. The head assembly as recited in claim 6, wherein a thickness of the substrate is less than about 0.75 mm.

8. The head assembly as recited in claim 1, wherein the first wrap angle is in a range of about 0.70° to about 1.1°.

9. The head assembly as recited in claim 1, wherein the second wrap angle is less than about 2°.

10. The head assembly as recited in claim 1, wherein the outrigger has a substantially planar tape bearing surface.

11. The head assembly as recited in claim 1, wherein the outrigger has a tape bearing surface, the outrigger tape bearing surface having a rounded portion and a planar portion.

12. The head assembly as recited in claim 1, wherein the outrigger has a rounded tape bearing surface.

13. The head assembly as recited in claim 1, further comprising:
a second substrate having a second substrate tape bearing surface,
a plurality of elements coupled to the second substrate and positioned towards the second substrate tape bearing surface, and
a second base coupled to the second substrate, the second base having an outrigger formed integrally therewith.

14. The head assembly as recited in claim 13, wherein the planes of the tape bearing surfaces of the substrate and second substrate are angled relative to one another for setting internal wrap angles of the tape with respect to the tape bearing surfaces of the substrate and second substrate.

15. The head assembly as recited in claim 14, wherein the first wrap angle is about equal to the internal wrap angles.

16. A tape drive system, comprising:
a head assembly as recited in claim 1;
a drive mechanism for passing a magnetic recording tape over the head assembly; and
a controller in communication with the head assembly.

17. A magnetic head assembly, comprising:
two modules coupled together in opposing relation, each module comprising:
a substrate and having a tape bearing surface;
a plurality of elements coupled to the substrate and positioned towards the tape bearing surface, the elements being selected from a group consisting of readers, writers, and combinations thereof; and a base coupled to the substrate, the base having an integrally formed outrigger, the outrigger having a tape bearing surface, the outrigger being for causing a tape passing thereacross to approach the substrate at a first wrap angle relative to a plane of the tape bearing surface of the substrate, wherein the base and the substrate are separate parts that are coupled together, wherein, for each module, a second wrap angle is defined between the plane of the outrigger tape bearing surface and a tape traveling towards the outrigger tape bearing surface, the second wrap angle being greater than about 0.1.

18. The head assembly as recited in claim 17, wherein the tape bearing surfaces of the substrates of the modules are angled relative to each other for defining an internal wrap angle of each of the modules.

19. The head assembly as recited in claim 18, wherein the first wrap angles are each about equal to the internal wrap angles.

20. The head assembly as recited in claim 17, wherein, on each module, the tape bearing surfaces of the substrate and outrigger lie along substantially parallel planes, the planes being offset from one another.

21. The head assembly as recited in claim 20, wherein the plane of the outrigger tape bearing surface is positioned in a range of about 0.002 to about 0.014 mm below the plane of the substrate tape bearing surface.

22. The head assembly as recited in claim 17, wherein, on each module, the outrigger tape bearing surface is about parallel to a tape oriented at a desired wrap angle relative to the substrate tape bearing surface.

23. The head assembly as recited in claim 17, wherein, on each module, the outrigger tape bearing surface is angled from the substrate tape bearing surface by greater than a desired wrap angle of a tape relative to the substrate tape bearing surface.

24. The head assembly as recited in claim 17, wherein a thickness of each substrate is less than about 1 mm.

25. The head assembly as recited in claim 24, wherein a thickness of each substrate is less than about 0.75 mm.

26. The head assembly as recited in claim 17, wherein, for each module, the first wrap angle is in a range of about 0.7° to about 1.1°.

27. The head assembly as recited in claim 17, wherein the second wrap angle is less than about 2°.

28. The head assembly as recited in claim 17, wherein, on each module, the outrigger has a planar tape bearing surface.

29. The head assembly as recited in claim 17, wherein, on each module, the outrigger has a tape bearing surface, the outrigger tape bearing surface having a rounded portion and a planar portion.

30. The head assembly as recited in claim 17, wherein, on each module, the outrigger has a rounded tape bearing surface.

31. A tape drive system, comprising:
a head assembly as recited in claim 17;
a drive mechanism for passing a magnetic recording tape over the head assembly; and
a controller in communication with the head assembly.

32. A method of creating a magnetic head assembly, comprising:
coupling a substrate to a base, the substrate having elements formed thereon, the base having an outrigger portion integrally formed therewith; and
creating a tape bearing surface on the outrigger portion of the bases,
wherein the substrate has a tape bearing surface;

wherein the elements of the substrate are positioned towards the tape bearing surface, the elements being selected from a group consisting of readers, writers, and combinations thereof; and the outrigger being for causing a tape passing thereacross to approach the substrate at a first wrap angle relative to a plane of the tape bearing surface of the substrate, wherein the base and the substrate are separate parts that are coupled together, wherein the outrigger has a tape bearing surface, a second wrap angle being defined between the plane of the outrigger tape bearing surface and a tape traveling towards the outrigger tape bearing surface, the second wrap angle being greater than about 0.1°.

33. The method as recited in claim 32, wherein the elements were formed on the substrate prior to the coupling of the substrate to the base.

* * * * *